March 8, 1955   J. A. BATY ET AL   2,703,432
APPARATUS FOR MANUFACTURE OF BATTERY PLATE SEPARATORS
Filed March 1, 1950   3 Sheets-Sheet 2
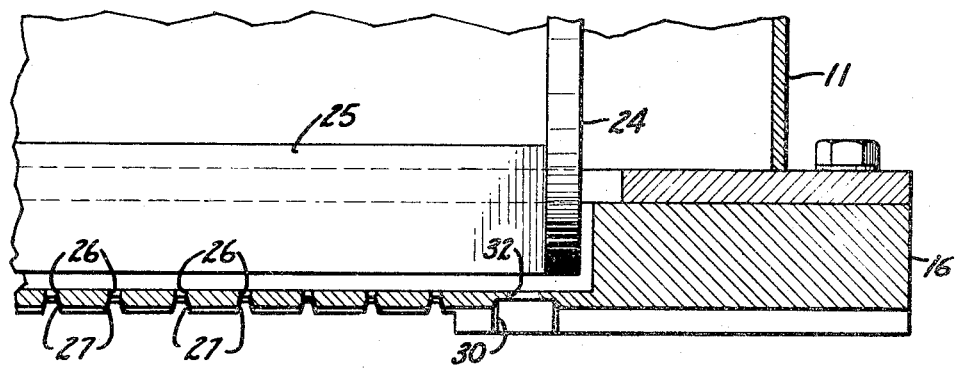
Fig. IV
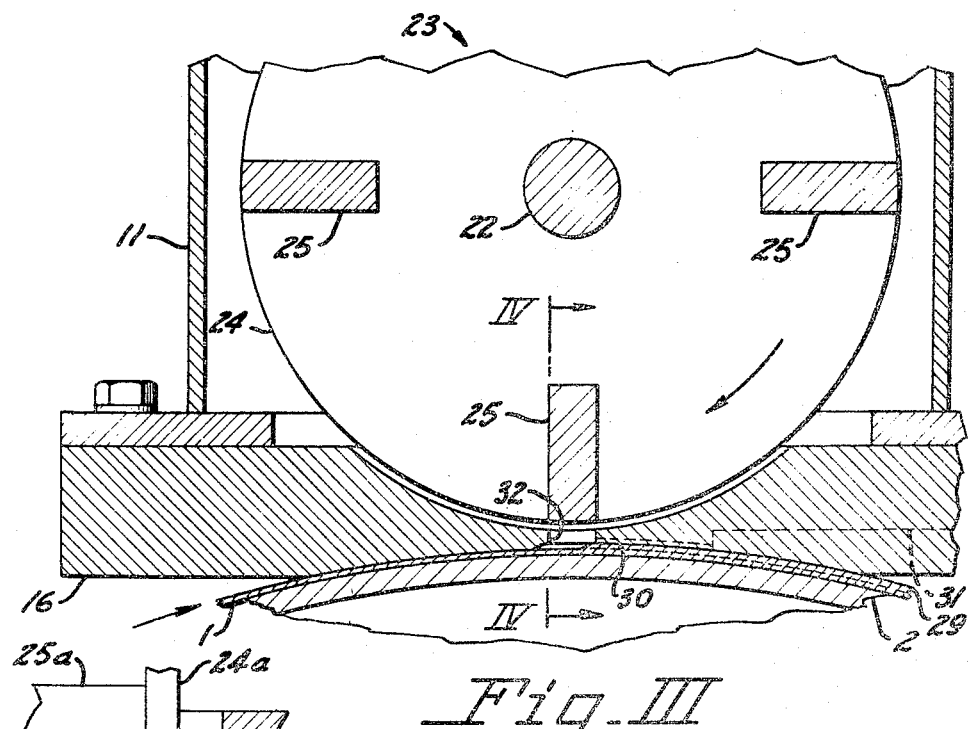
Fig. III
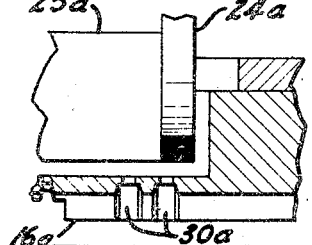
Fig. IVa
INVENTOR.
Joseph A. Baty
Malcolm P. Crowther
BY
Marshall, Marshall & Leonard
ATTORNEYS March 8, 1955  J. A. BATY ET AL  2,703,432
APPARATUS FOR MANUFACTURE OF BATTERY PLATE SEPARATORS
Filed March 1, 1950  3 Sheets-Sheet 3
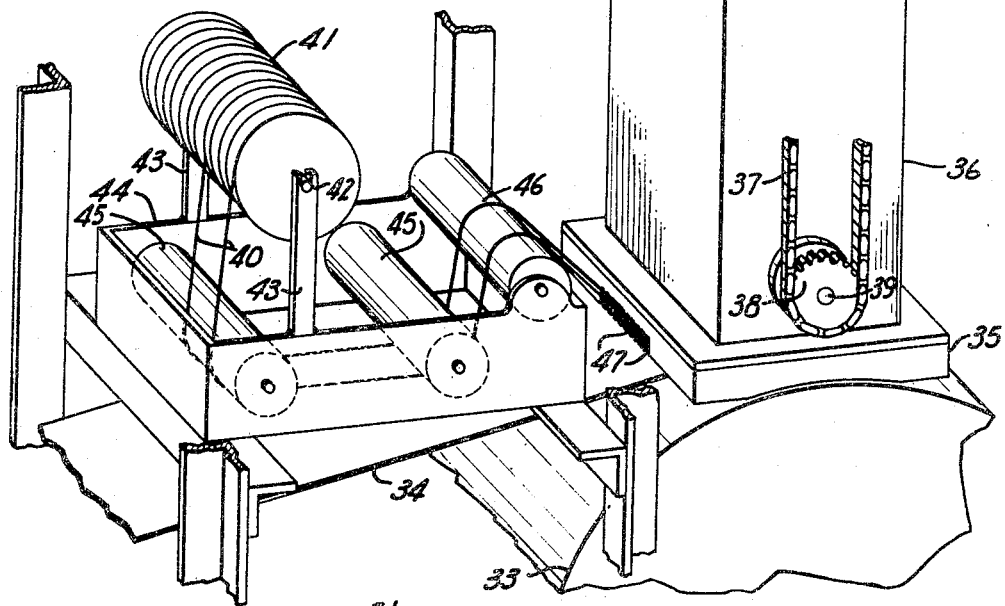
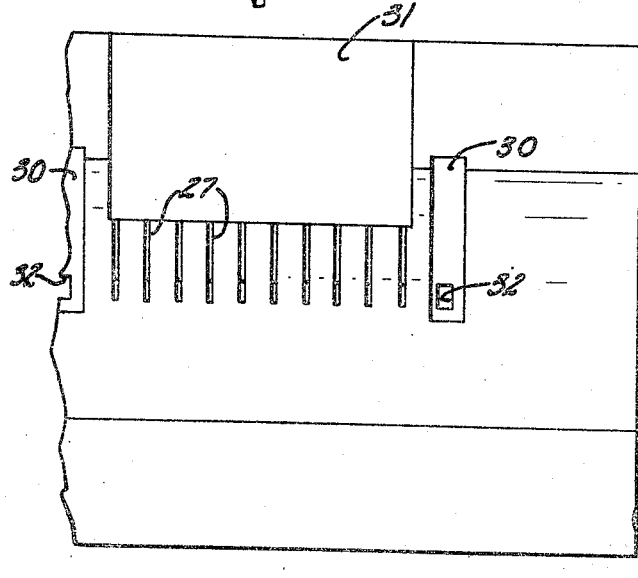
INVENTOR.
Joseph A. Baty
Malcolm P. Crowther
BY
Marshall Marshall Leonard
ATTORNEYS

United States Patent Office 2,703,432
Patented Mar. 8, 1955

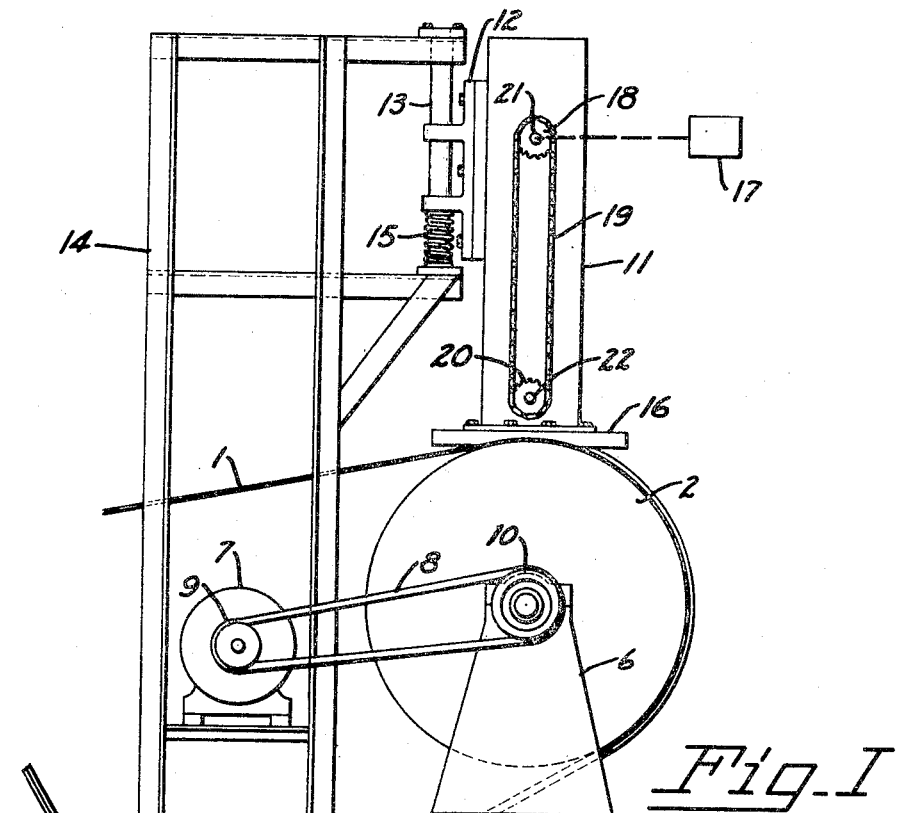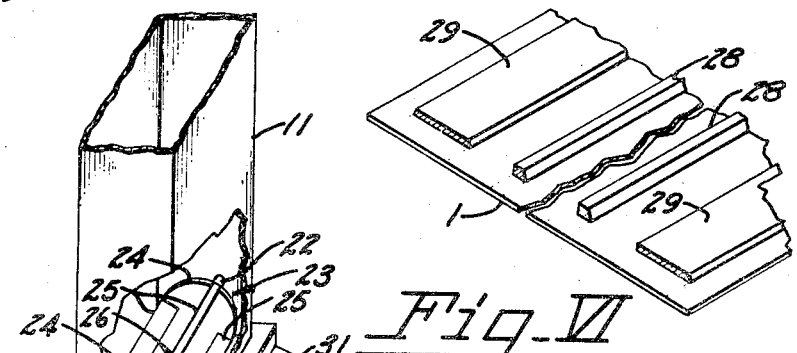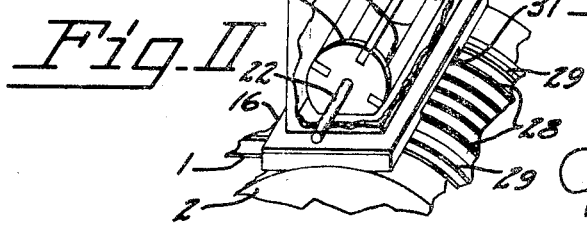

2,703,432

APPARATUS FOR MANUFACTURE OF BATTERY PLATE SEPARATORS

Joseph A. Baty, Weston, and Malcolm P. Crowther, Maumee, Ohio

Application March 1, 1950, Serial No. 147,018

6 Claims. (Cl. 18—1)

This invention relates to the manufacture of separator plates suitable for use between the plates of storage batteries and in particular to a machine for continuously molding a jelly-like slurry that sets to form a microporous material on a treated mat to provide upstanding ribs on the surface of the mat.

A battery plate separator to be commercially acceptable must have sufficient mechanical strength to maintain the physical separation between the battery plates, it must have sufficiently fine structure so as to prevent the passage of particles from one plate to the other and prevent such particles from forming electrically conducting paths through the separator, and last it must be sufficiently porous to provide relatively free movement of the battery electrolyte between the plates and through the separator. Wood separators made of treated cedar have been used to separate plates of storage batteries and are fairly satisfactory except that they are limited as to physical strength and resistance to acid. Other materials have been tried but were found unsatisfactory for lack of a sufficiently fine pore structure to permit the free passage of electrolyte and still maintain complete separation of the plates and small particles that may be dislodged from the plates.

It has been proposed to construct battery plate separators from a silica gel and glass fiber material which gives the required strength as well as sufficient microporosity to satisfy the electrical requirements in the battery.

While such a material has been made in a sheet form it has heretofore been impossible to form the required raised ribs on the sheet material.

The principal object of this invention is to provide a continuous molding apparatus for applying rib forming material to a continuous strip or sheets of material suitable for storage battery plate separators.

Another object of the invention is to provide an apparatus for continuously molding a fibrous, slurry-like material having characteristics that preclude the use of ordinary pumps for handling the material.

A still further object of the invention is to provide a machine suitable for continuously molding ribs of a fibrous slurry onto the surface of a treated mat.

A still further object of the invention is to provide a machine for molding a yarn re-inforced rib onto the surface of a mat.

A still further object of the invention is to provide a machine for introducing yarn into the ribs during the molding of the ribs on the surface of the mat or sheet of separator material.

More specific objects and advantages are apparent from the following description of the improved method and of an apparatus for carrying out the improved method of molding the fibrous slurry.

According to the invention the fibrous slurry while being continually mixed and agitated is introduced into molding conduits which are bounded in part by the mat of material on which the ribs are formed and which are bounded in part by the sides and bottoms of grooves cut in a shoe riding on the mat of separator material. The fibrous slurry is of a jelly-like consistency such that it maintains its shape while traveling from the molding conduit to a reacting bath where it is hardened by a reaction that coagulates and sets the gel-forming portion of the slurry. The invention contemplates making the molding conduits or grooves in the shoe of sufficient length in the direction of travel of the mat such that the flow of rib-forming material is controlled by the movement of the mat. This is accomplished by making the grooves sufficiently long in relation to the length of the periphery of a cross-section of the groove so that the static resistance to flow of the slurry, which has characteristics somewhat similar to a weak gel, is greater than the pressure head on the slurry at the entrance to the molding conduits or grooves. This static resistance to flow is reduced practically to zero by the movement of the mat so that continuous commercially satisfactory ribs are formed regardless of wide variations in speed of movement of the mat under the shoe.

The invention also contemplates a thorough stirring and mixing of the slurry at the entrance to the molding conduits or grooves so that a continuous supply of moldable slurry is maintained at the entrance to each of the grooves.

As an ancilliary feature the invention also includes a process for introducing reinforcing yarn into the ribs during the molding of the ribs as well as the provision of apparatus for carrying out this operation. The introduction of the reinforcing yarn, which may be made of glass fiber, is accomplished by impregnating the yarn with slurry and drawing it through the grooves in the shoe while a rib-forming slurry is supplied to the same grooves and fills the space in the grooves not occupied by the yarn. The motion of the mat serves to draw the yarn through the grooves.

The mat or sheet material for the separators is preferably made by impregnating a mat of glass fibers with a slurry or latex comprising a plastic binder-in-aqueous sodium silicate solution which is prepared by thoroughly admixing 5400 parts of a standard commercial polystyrene-in-water latex (40 per cent solids), 3000 parts of a plasticizer (60 per cent solids), 3000 parts of wood flour filler, 200 parts of ground glass fibers and 30,000 parts of N-brand sodium silicate solution. (As used herein, the terms "per cent" and "parts" mean per cent and parts by weight.) The plasticizer is composed of 40 parts of an asphaltic extender for the polystyrene which is sold under the name "Hard Stanolite (140° M. P.)," 35 parts of a mixture of methylnaphthalenes sold under the name "Indocene-90," 5 parts of a monoester of "Polyethylene Glycol 600" and a high molecular weight fatty acid (as an emulsifying agent) sold under the name "Cresset-600," and 53 parts of water. N-brand sodium silicate solution is an aqueous solution containing 8.9 per cent $Na_2O$ and 28.7 per cent $SiO_2$, and having a density of 410 Baumé.

The rib-forming slurry is preferably composed of a similar latex having a slightly higher resin content to give it greater strength. Either slurry is hardened by immersion in a 20% aqueous ammonium sulfate solution.

When reinforcing yarn is employed it is preferably impregnated with the same type of slurry as is used in the rib or it may be impregnated with any hardenable composition that is compatible with and that bonds with the hardened slurry.

The invention further contemplates, as a means for maintaining good contact between the mat and the grooved shoe, that the mat be carried on the surface of a large pulley or drum as it is presented to and drawn beneath the shoe.

Preferred apparatus for carrying out the improved process is illustrated in the accompanying drawings.

In the drawings:

Figure I is a side elevation showing the path of the mat as it is drawn beneath the shoe, around the pulley and into a processing bath for hardening the rib-forming material.

Figure II is a partially broken away, isometric view of the slurry tank and agitator that maintains a supply of slurry on the upper surface of the shoe.

Figure III is an enlarged, fragmentary, vertical section taken through the shoe to show the relationship between the agitator, the shoe, and the path of the mat.

Figure IV is a fragmentary vertical section taken along the line IV—IV of Figure III through the thinnest portion of the shoe and showing generally the shape of the grooves that serve to mold the ribs.

Figure IVa is a fragmentary vertical section, similar to a portion of Figure IV, showing a modified form for molding marginal ribs.

Figure V is a fragmentary view of a bottom surface of the shoe to show the position of the rib-forming grooves and their relative lengths.

Figure VI is an isometric view of a section of a completed separator.

Figure VII is a schematic illustration showing a modified form of the machine and apparatus for feeding yarn through an impregnating bath and into the grooves employed to mold the ribs on the separator material.

These specific figures and the accompanying description are intended merely to illustrate the invention and not to impose limitations on its scope.

In an apparatus for carrying out the improved process a mat 1 of separator material is led over a large diameter pulley or drum 2 and then beneath idler rolls 3 as it passes through a processing bath 4 contained in a tray 5. The pulley or drum 2, which is carried on pedestals 6, is driven from a motor 7 by suitable power transmission means such as a belt 8 engaging a motor pulley 9 and a pulley 10 on the drum shaft. The motor 7 includes sufficient gear reduction so that a suitable speed is obtained at the periphery of the drum 2. A slurry tank 11 is carried on a bracket 12 which is slidably mounted on vertical rods 13 supported in a framework 14. Helical compression springs 15 sleeved over the lower ends of the rods 13 resiliently support the bracket 12 and the slurry box 11 carried thereon.

A shoe 16 attached to the bottom of the slurry box 11 rides on the mat 1 as it is drawn over the drum 2. To secure sufficient length of contact the bottom of the shoe 16 is cylindrically concave to match the periphery of the drum 2.

Also indicated in Figure I is a motor 17 arranged to drive a sprocket 18 which is connected through a chain 19 to a second sprocket 20. The sprockets 18 and 20 are carried on the ends of stirrer shafts 21 and 22. Each of the stirrer shafts 21 and 22 carries a rotatable cage 23 (Figure II) comprising a pair of circular end plates 24 and interconnecting blades 25. The interconnecting blades 25 of the rotated cage 23 keep the slurry stirred and prevent any separation of the solids from the liquids in the region immediately over the shoe 16. This agitation is necessary so that the slurry will flow evenly into and through a series of openings or orifices 26 leading through the shoe and opening into grooves 27 cut in that surface of the shoe 16 facing the mat or sheet 1.

The shoe 16, which on its lower surface is cylindrically concave to match the surface of the drum 2, is also cylindrically concave on its upper surface (facing into the slurry tank) for the dual purpose of (a) extending the wiping action of the blades 25 of the stirrer cage and (b) to shorten the length of the orifices 26 to a bare minimum. It has been found that the shorter the orifices the more evenly the material flow therethrough into the grooves 27. It is also noted that clearance equal to several times the particle size of the filler material is left between the outer edge of each of the blades 25 and the adjacent concave surface of the shoe 16. This space is left to avoid any possibility of binding which occurs if closely matched relatively moving surfaces are exposed to the slurry. It is this tendency of the slurry to bind in clearance spaces between relatively moving members that prevents use of ordinary material handling equipment for feeding the slurry during the molding of the ribs onto a sheet of separator material.

The grooves 27 cut in the lower face of the shoe 16 are shaped in cross section according to the shape of the ribs to be formed on the sheet of separator material. In forming the separator, a portion of which is shown in Figure VI, the grooves are generally trapezoidal in cross section and intermediate ribs 28 of the separator are formed by material flowing through and molded by the grooves 27. A plurality of closely spaced ribs or single wide ribs 29 are formed along each side margin of the separators, these wide ribs, if used, being molded by wider grooves 30 or the closely spaced ribs by sets of grooves 30a (Fig. IVa) located at each end of the series of openings 26 through the shoe 16.

Referring to Figures III and V it will be noticed that the grooves 27 are shorter in the direction of movement of the mat 1 than are the wider grooves 30. This difference in length is provided by cutting out a section of the shoe to leave a recess 31.

The lengths of the grooves, for satisfactory operation, are determined by the consistency of the slurry and by the periphery of a cross section of the groove. The slurry has a tendency to display gel-like characteristics in that a certain minimum pressure head must be developed before any flow of the material takes place and that for increased pressure the flow increases as it does for any viscous liquid. In the molding apparatus just described advantage is taken of this gel-like characteristic of the slurry to control the flow of slurry from the tank 11 onto the mat 1. The lengths of the grooves 27 and 30 are sufficient so that if the mat is standing stationary the pressure head developed by the slurry in the tank 11 plus the centrifugal force produced by the action of the rotary cage blades 25 is not quite sufficient to cause flow of the slurry through the full length of the grooves. With the groove sizes indicated in the drawings slurry may ooze slowly from the longer wide grooves 30 before the shorter narrow grooves 27 are filled throughout their complete length. This results because the ratio of the length of the grooves 30 to the periphery of a cross section is much less than is the ratio of the length of the groove 27 to the periphery of its cross section. To further control this tendency of excess flow through the grooves 30 orifices 32 leading into these wider grooves are made smaller in proportion to the size of the groove than are the orifices 26 leading to the grooves 27.

The lengths of the grooves and the pressure head applied to the slurry in the orifices 26 or 32 are such that any movement of the mat induces flow of the slurry through the molding grooves 27 or 30 at the same rate that the mat is moved beneath the shoe. Thus it is the movement of the mat itself that controls the quantity of material flowing through the molding grooves while the grooves are maintained full without clogging of the orifices 26 or 32 by the movement of the rotary cage blades 25.

It has been found that with the preferred slurry as described previously suitable lengths of the grooves are in the order of 1½ times to 3 times the length of a perimeter of a cross section of the groove. Also since the orifices cannot be wider than the grooves, the orifices 26 leading into the grooves 27 are extended along the grooves so that they are longer than the thickness of the shoe at the orifice. This is desirable to promote proper flow of the fibrous material.

The rotary cage stirrers 23 including the blades 25 may be rotated in either direction to produce acceptable flow of slurry through the orifices 26 and into the grooves. Slightly better results are obtained, particularly in the uniformity of the flow and thus the uniformity of the ribs, if the stirrers are rotated with the blades 25 moving counter to the motion of the mat 1 as they pass the orifices 26 and 32. This type of motion is believed to reduce the shearing effects otherwise encountered as the material is driven against the edge of each of the orifices 26. Thus if the blades 25 pass the orifices 26 in the same direction as the mat 21 is moving the material tends to some extent to pile up against the edge of the orifice rather than to flow cleanly through the orifice and into the groove. With the blades 25 moving counter to the movement of the mat the blades 25 tend to drive the slurry against the opposite edges of the orifices 26 while the mat 1 tends to carry the slurry away from that edge thus reducing the tendency for the material to be impacted. In any event it is necessary that the shoe be as thin as possible and that the flow of slurry be controlled entirely by the movement of the mat along the grooves 27. If the orifices 26 are of greater length in the direction of flow of the slurry therethrough, the resistance to flow through the orifice, which varies from time to time in an erratic manner, may actually interrupt the flow through some of the orifices thus producing breaks in the continuity of the ribs being molded. By making the orifices very short in the direction of flow, the flow is controlled almost entirely by the mat with the result that very uniform ribs are produced.

Since one of the requisites of a satisfactory battery plate separator is high strength and abrasion resistance it may be desirable at times to still further increase the strength of the ribs that are molded on the surface of the separator plate or mat by including in such ribs a reinforcing yarn or cord of glass fiber or other suitable material. It is desirable that the yarn be impregnated with a slurry or resin that is compatible with and that will bond to the slurry used in the ribs as well as in the mat itself.

Figure VII schematically illustrates an apparatus that may be used for molding ribs on a separator mat and at the same time incorporating in such ribs a yarn or cord that serves as a reinforcement to increase the strength of the ribs. This apparatus which is similar in many respects to the apparatus previously described comprises a drum 33 over which a mat 34 of separator material is drawn as the mat 34 is presented to the concave lower surface of a shoe 35 forming part or all of the bottom of a slurry box 36. The slurry box 36 may be supported in the same manner as is the slurry box 11. A stirrer or agitator is included in the slurry tank and is driven by a chain 37 running over a sprocket 38 mounted on the end of a shaft 39 carrying the stirrer. This much of the apparatus is similar to that previously described except that the shoe 35 has the molding grooves in its lower face extended clear across the face rather than starting at the orifices leading from the slurry tank.

Strands 40 of yarn suitable for reinforcing the ribs are supplied from bobbins 41 mounted on a shaft 42 carried in uprights 43 erected from side walls of a tank 44. From the bobbins 41 the yarn 40 is drawn under a pair of rollers 45 partially immersed in a slurry or impregnating resin contained within the tank 44. After passing the second of the partially submerged rollers 45 the yarn is drawn upwardly over a third roller 46 and thence lead to slots 47 in the adjacent face of the shoe 35. The slots 47 are the ends of grooves extending across the lower face of the shoe and serving to mold the slurry into ribs as it is discharged from the slurry tank 36. The yarn, which is impregnated with resin or slurry as it passes through the tank 44, is drawn through the slots 47 into molding grooves in the shoe 35 by the motion of the mat 34. This method is preferable to feeding the yarn down through the slurry tank 36 and out through the orifices and into the molding grooves inasmuch as it is much easier to thread the yarn in the arrangement shown as well as making it possible to use different compositions of slurry for impregnating the yarn and forming the rib.

The improved process of continuously molding battery plate separator ribs onto a separator mat may be carried out by any apparatus capable of continuously supplying sufficient quantities of molding compound and continuously molding the compound as the mat is carried along. The molding groove should be of sufficient length so that the movement of the mat controls the rate of feed of material and the slurry must be of such consistency that it will hold its molded shape until it can be hardened by immersion in a bath that reacts with the slurry. The apparatus described in the accompanying drawings is a preferred apparatus for carrying out the process.

Various modifications in structure of the apparatus may be made without changing the process or losing the advantages of continuously molding separator plate ribs onto a separator mat.

Having described the invention, we claim:

1. An apparatus for applying a fibrous slurry as ribbing on a sheet of material, in combination, means for supporting and moving the sheet of material, a shoe positioned relative to said supporting means for riding on the sheet of material as carried by the supporting means, said shoe having at least one groove extending at least part way across the shoe in the direction of movement of the material with the material forming a side of the groove with the groove open at the end thereof which is in trailing relationship to the direction of movement of the sheet of material, said shoe having an opening for the groove opening into the groove at the end thereof opposite to the trailing end, a tank above the shoe and connected therewith for holding a slurry above the shoe in position to feed into the opening, said groove having a length which is greater than the length of a perimeter of the cross section of the groove such that the slurry will not feed through the groove by the gravity pressure head on the slurry with the sheet of material stationary, guide means aligned with said groove and extending from the end of the shoe opposite the end at which the groove is open to said groove adjacent said opening in said shoe for guiding a moving glass fiber yarn into said groove at the shoe opening and on through the groove and out the open end thereof to assist the moving sheet of material in drawing the slurry through said shoe opening and on out the open end of the groove, and reel means for feeding glass fiber yarn into said guide means.

2. An apparatus for applying a fibrous slurry as ribbing on a sheet of material, in combination, means for supporting and moving the sheet of material, a shoe positioned relative to said supporting means for riding on the sheet of material as carried by the supporting means, said shoe having a plurality of grooves extending at least part way across the shoe in the direction of movement of the material with the material forming a side of the groove with the grooves open at the ends thereof which are in trailing relationship to the direction of movement of the sheet of material, said shoe having an opening for each of the grooves opening into the grooves at the ends and said shoe having a face thereof within said tank sloping toward said opening therof opposite to the trailing ends, a tank above the shoe and connected therewith for holding a slurry above the shoe in position to feed into the opening, each of said grooves having a length which is 1½ to 3 times the length of the perimeter of the cross section of the groove such that the slurry will not feed through the grooves by the gravity pressure head on the slurry with the sheet of material stationary, and agitating means in said tank moving in close running relationship to said face and said opening for promotion of the uniform flow of slurry through the opening.

3. An apparatus for applying a fibrous slurry as ribbing on a sheet of material, in combination, means for supporting and moving the sheet of material, a shoe positioned relative to said supporting means for riding on the sheet of material as carried by the supporting means, said shoe having a plurality of grooves extending at least part way across the shoe in the direction of movement of the material with the material forming a side of the groove with the grooves open at the ends thereof which are in trailing relationship to the direction of movement of the sheet of material, said shoe having an opening for each of the grooves opening downwardly into the grooves at the ends thereof opposite to the trailing ends, a tank above the shoe and connected therewith for holding a slurry above the shoe in position to feed into the opening, each of said grooves having a length which is greater than the length of a perimeter of the cross section of the groove such that the slurry will not feed through the grooves by the gravity pressure head on the slurry with the sheet of material stationary, and agitating means positioned directly over and in close running relationship to said opening and the groove immediately therebelow and movable in a direction opposite to the direction of movement of the sheet of material to promote uniform flow of slurry through the opening.

4. An apparatus for applying a fibrous slurry as ribbing on a sheet of material, in combination, means for supporting and moving the sheet of material, a shoe positioned relative to said supporting means for riding on the sheet of material as carried by the supporting means, said shoe having a plurality of grooves extending at least part way across the shoe in the direction of movement of the material with the material forming a side of the groove with the grooves open at the ends thereof which are in trailing relationship to the direction of movement of the sheet of material, said shoe having an opening for each of the grooves opening into the grooves at the ends thereof opposite to the trailing ends, a tank above the shoe and connected therewith for holding a slurry above the shoe in position to feed into the opening, each of said grooves having a length which is greater than the length of a perimeter of the cross section of the groove such that the slurry will not feed through the grooves by the gravity pressure head on the slurry with the sheet of material stationary, and agitating means positioned directly over said opening and movable in a direction opposite to the direction of movement of the sheet of material to promote uniform flow of slurry through the opening, said shoe having the face thereof within said tank provided with a concave surface immediately at said opening to reduce the length of the opening through said shoe, said agitating means being movable through the concave portion of said shoe for promotion of the uniform flow of slurry through the opening.

5. An apparatus for applying a fibrous slurry as ribbing on a sheet of material, in combination, means for supporting and moving the sheet of material, a shoe positioned relative to said supporting means for riding on the sheet of material as carried by the supporting means, said shoe having at least one groove extending at least part way across the shoe in the direction of movement of the material with the material forming a side of the groove with the groove open at the end thereof which is in trailing relationship to the direction of movement of the sheet of material, said shoe having an opening for the groove which opening is smaller in the direction of groove length than the groove but longer than the opening depth and which opens downwardly into the groove at the end thereof opposite to the trailing end, a tank above the shoe and connected therewith for holding a slurry above the shoe in position to feed into the opening, said groove having a length beyond the said opening in the direction of movement of the said sheet material at least one and a half times the periphery of the groove such that the slurry will not feed through the groove by the gravity pressure head on the slurry with the sheet of material stationary, and agitating means in said tank moving in close running relationship to said opening and the groove immediately therebelow.

6. An apparatus for applying a fibrous slurry as ribbing on a sheet of material comprising, in combination, means for supporting and moving the sheet material, a shoe positioned relative to said supporting means for riding on the sheet of material as carried by the supporting means, said shoe having a plurality of grooves extending at least part way across the shoe in the direction of movement of the material with the material forming a side of the groove with the grooves at the ends thereof which are in trailing relationship to the direction of movement of the sheet of material, said shoe having an opening for each of the grooves opening into the ends thereof opposite to the trailing ends, a tank above the shoe and connected therewith for holding a slurry above the shoe in position to feed into the opening, each of said grooves having a length which is greater than the length of a perimeter of the cross section of the groove such that the slurry will not feed through the grooves by the gravity pressure head on the slurry with the sheet material stationary, said shoe having the face thereof within said tank provided with sloping surfaces inclined toward said opening to reduce the depth of the opening in said shoe, and agitating means positioned directly over said opening and moving in close running relationship to the inclined surfaces immediately adjacent said opening to promote uniform flow of slurry through the opening.

References Cited in the file of this patent

UNITED STATES PATENTS

| Number | Name | Date |
|---|---|---|
| 896,504 | Adams | Aug. 18, 1908 |
| 1,468,446 | Graham | Sept. 18, 1923 |
| 1,469,815 | Lovejoy | Oct. 9, 1923 |
| 1,505,908 | MacKinnon | Aug. 19, 1924 |
| 1,630,451 | Ray | May 31, 1927 |
| 1,726,511 | Henry et al. | Aug. 27, 1929 |
| 1,960,997 | Halloran | May 29, 1934 |
| 2,054,448 | Russell | Sept. 15, 1936 |
| 2,066,596 | West | Jan. 5, 1937 |
| 2,108,952 | Urban | Feb. 22, 1938 |
| 2,129,162 | Robillard | Sept. 6, 1938 |
| 2,293,252 | Foster et al. | Aug. 18, 1942 |
| 2,327,627 | Esselen | Aug. 24, 1943 |
| 2,330,282 | Hazeltine et al. | Sept. 28, 1943 |
| 2,401,550 | Cook, Jr. | June 4, 1946 |
| 2,474,254 | Kauffman | June 28, 1949 |